Figures 1, 2:
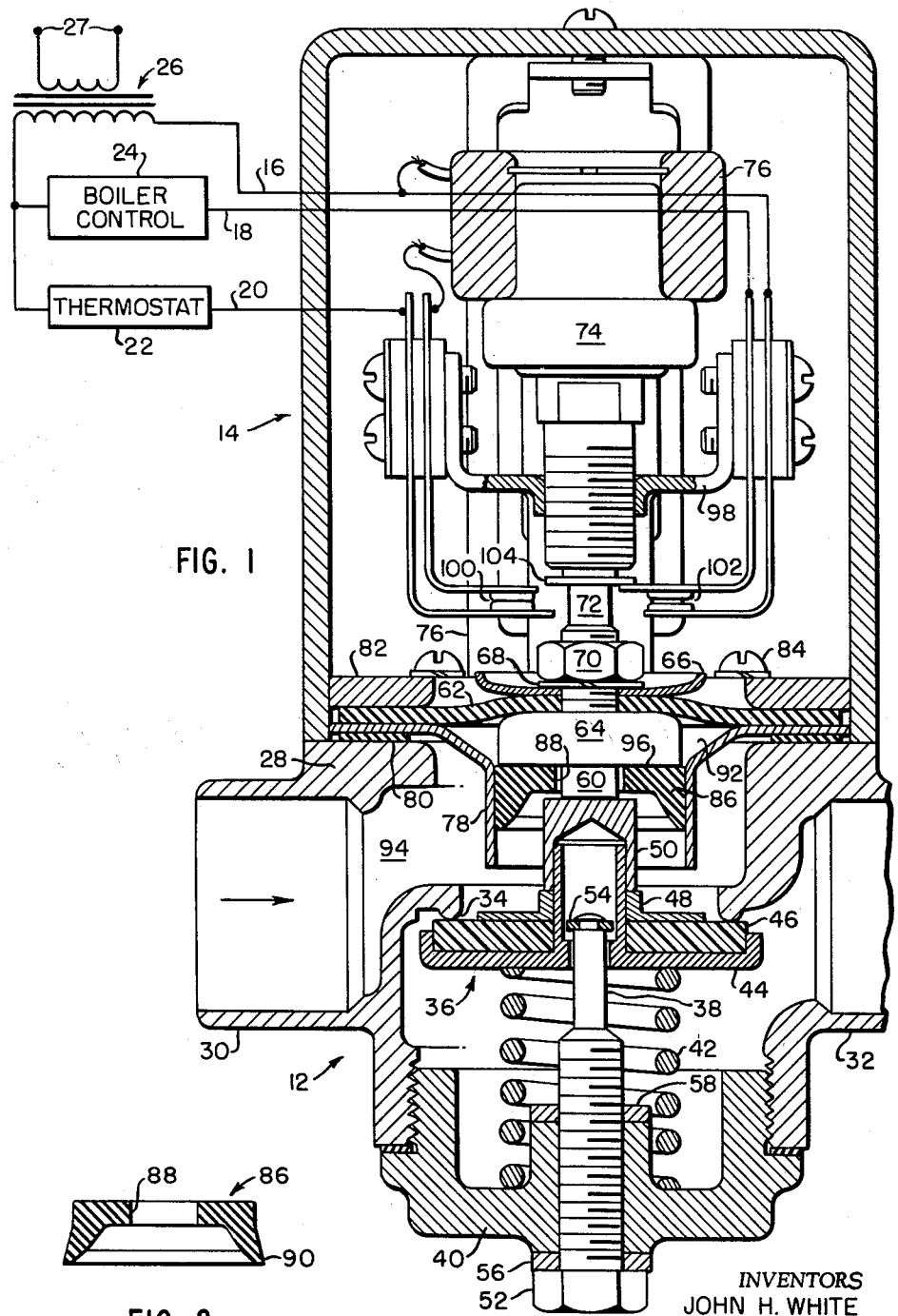

Jan. 5, 1965    J. H. WHITE ETAL    3,164,365
DIAPHRAGM SEALED VALVE
Filed June 22, 1962

INVENTORS
JOHN H. WHITE
WILLIAM B. DRURY
BY
Kenway, Jenney & Hildreth
ATTORNEYS 3,164,365
DIAPHRAGM SEALED VALVE
John H. White, Barrington, and William B. Drury, Providence, R.I., assignors to Taco, Inc., Cranston, R.I., a corporation of New York
Filed June 22, 1962, Ser. No. 204,553
11 Claims. (Cl. 251—335)

The present invention relates generally to valves of the type having an operating stem that is sealed by a flexible diaphragm member. Typically, such valves are of the poppet type, the valve stem passes through the diaphragm and the diaphragm is sealed peripherally about the stem. Various means external to the valve are used to actuate the stem, the diaphragm being flexible enough to permit the stem to travel the distance required to open and close the valve.

It is a principal object of this invention to provide added means to seal the valve if the diaphragm should fail in use. In a conventional valve of this type such failure produces leakage of large quantities of the circulating fluid.

A second object is to provide added sealing means operative in case of failure of the diaphragm in such a manner that the valve remains operative after failure of the diaphragm.

A further object is to provide added sealing means that are normally inoperative, whereby the advantages inherent in a diaphragm seal are obtained, and in case of failure of the diaphragm the added sealing means become effective to prevent substantial fluid leakage, while at the same time permitting the valve to function until the diaphragm can be repaired or replaced.

With the foregoing and other objects hereinafter appearing in view, the features of this invention reside in a novel added sealing arrangement for the valve including the use of a resilient seal member adapted under certain conditions to seal the space through which the valve stem communicates with the exterior of the valve.

According to another feature, the seal member is adapted under normal conditions to provide a leakage path for fluid flow to and from a space defined between itself and the diaphragm. After failure of the diaphragm a resulting change in the pressure differential across the seal member closes this leakage path and thereby provides a seal against further fluid flow to this space. The properties of the seal member are so related to the cooperating parts that it then operates as an effective seal while permitting the valve stem to be actuated.

Other features of the invention reside in certain features of structure, configuration and arrangements of the parts and modes of operation that will be evident from the following description of a preferred embodiment thereof, having reference to the appended drawing in which FIG. 1 is a side elevation in section of a poppet valve embodying the invention; and FIG. 2 is a detailed view of the unstressed resilient seal member.

Referring to the drawing, a valve for controlling the flow of fluid in a thermostatically controlled system is shown generally at 12, and mounted upon the valve is an actuator unit shown generally at 14. This unit is connected by three wires 16, 18 and 20 to a thermostat 22, a boiler control 24, and a transformer 26 connected to a source of alternating current 27. The valve controls the flow of circulating fluid in the direction shown by the arrow, in response to operation of the thermostat 22.

As more fully described below, when the thermostat 22 closes the circuit from the transformer 26 to the wire 20 the valve opens, and after it has opened a predetermined distance the circuit to the boiler control 24 is closed and remains closed while the thermostat circuit is closed. The valve opens to a predetermined limit position and cycles at or near this position continuously while the thermostat circuit is closed, and when the latter circuit is opened the valve closes.

Referring more specifically to the structure of the valve 12, there is provided a cast metal body 28 with inlet and outlet fittings 30 and 32, respectively. A valve seat 34 is defined by a partition in the body 28.

A valve member 36 cooperates with the seat, fitting slidably over a normally fixed spindle 38, the spindle being threaded in a cap 40 which is in turn threaded into the valve body 28. A compression spring 42 provides a bias tending to close the valve.

More specifically, the valve 36 comprises a flanged tubular metal member 44 over which is received a washer-shaped seating member 46 which is preferably resilient. The member 46 is held in place by a retaining ring 48 and an end cap 50.

The above-described valve structure provides means for opening the valve manually, for example in an emergency. This is accomplished by applying a wrench to the head 52 of the spindle 38 an unthreading the spindle from the cap 40. Sufficient unthreading causes a split ring 54 on the spindle to engage an inwardly projecting shoulder on the member 44 of the valve and to draw the valve away from the seat 34.

The valve is actuated by a stem 60 engaging the cap 50. The stem extends to the space exterior to the valve 12 through a flexible diaphragm 62 which consists of suitable sheet material such as rubber, coated or impregnated woven fabric, plastic or other suitable material. This diaphragm provides a normal seal for the valve stem to prevent leakage of the circulating fluid.

The stem 60 is sealed to the diaphragm 62 by an arrangement including a plug member 64 integral with or threaded upon it, a shield plate 66, a lock washer 68 and a nut 70. The nut is tightened to clamp the diaphragm 62 tightly between the shield plate 66 and the plug member 64.

The stem 60 has bearing upon it an actuator member 72 slidably extending from an actuator 74 fixedly mounted upon a frame 76 secured to the valve body 28. The actuator contains a suitable thermal sensitive material such as wax or a wax-like material and is closely associated with a resistance coil heater 76. It will be understood that the particular forms of actuator 74 and heater 76 are not pertinent to the present invention, and that any suitable forms may be employed, as will occur to one familiar with this art.

As previously stated, an object of this invention is to provide added means to seal the valve in case the diaphragm 62 should fail or burst. To this end, there is provided a sleeve 78 for the valve, which is shown as a flanged tubular thin-walled member sealed to the body 28 against a gasket 80, the tubular portion being of larger diameter than the plug member 64. The diaphragm 62 is peripherally clamped against the sleeve 78 by an annular ring 82 held in place by screws 84 threaded into the body 28.

An annular flexible seal member 86, shown in its unstressed condition in FIG. 2, is received about the stem 60 and has a central opening 88 of appreciably larger diameter than that of the stem. Preferably, the seal member has a resilient, slightly flared flange portion 90 which is radially inwardly deflected upon insertion of the member into the sleeve 78 to provide a tight fit. The member 86 is preferably fabricated of synthetic rubber or a similar suitable resilient material.

By means of the actuator unit 14 hereinafter more fully described, the valve stem 60 and the plug member 64 to which it is attached are moved downwardly to open the valve against the reaction of the spring 42, and upwardly to allow the spring to close the valve. In the downward movement the plug member 64, being of smaller diameter than the sleeve 78, freely enters the latter and after an initial movement pushes the seal member 86 downwardly against the frictional resistance of the wall of the sleeve. When the stem 60 moves upwardly, the frictional resistance of the sleeve 78 restrains the seal member 86 in its lowest position reached when the valve was opened for an initial movement until pushed by the end cap 50. In succeeding downward and upward movements of the stem 60 the seal member 86 tends to remain in its limit positions due to its tight fit with the sleeve 78 until moved by the parts 64 and 50, and the circulating fluid readily enters and leaves a space 92 adjacent the diaphragm 62 by passing through the opening 88 around the stem 60. Thus the pressure in the space 92 is equalized with the pressure in the space 94 within the body of the valve.

The valve continues to operate in a manner similar to a conventional diaphragm sealed valve, until the diaphragm 62 fails or bursts due to age, wear or other factors. This causes a drop in pressure toward the atmospheric level in the space 92 adjacent the diaphragm and produces a corresponding pressure drop across the seal member 86. This pressure drop is sufficiently great to force the seal member 86 firmly against the plug member 64 against the frictional drag of the sleeve 78. The plug member 64 has a flat annular surface adapted to fit smoothly against the adjacent surface 96 of the seal member 86 to provide a sealed fit. This prevents further leakage of fluid through the opening 88; and similarly, the pressure differential across the seal member assists in preventing leakage of fluid between the periphery of the seal member and the sleeve 78.

If the seal member 86 is separated from the plug member 64 when the diaphragm breaks, as when the valve is closed, there will be a slight leakage of fluid through the space 88 until the seal member 86 has seated upon the plug member 64. However, this will ordinarily involve only a small quantity and the seal stops all leakage after seating has been effected.

After the diaphragm has failed and the seal member 86 has become effective in the manner described above, the valve is still in an operative condition since the plug member 64 and the seal member 86 are free to reciprocate in the sleeve 78 under the force of the actuator 74, but under these conditions the increased frictional drag of the sleeve 78 upon the seal member 86 must be overcome. By a proper design it is possible for the unit to operate effectively for an extended period of time until the diaphragm can be replaced or repaired.

It is also possible to construct a valve like that illustrated in the drawing, but having no diaphragm 62. We have successfully constructed and operated such a valve for extended periods. However, the diaphragm 62 is preferred for normal operation, since it does not impose as large a frictional drag on the valve stem.

We next refer to the electrical controls for operating the valve. These include a bracket 98 threaded on the actuator 74 and supporting normally closed contacts 100 and normally open contacts 102. A ring 104 mounted on the actuator member 72 reciprocates with the latter, and in its downward movement first closes the contacts 102 and after further movement opens the contacts 100. The contacts 100 are in series connection with the heater 76 and the thermostat 22. The contacts 102 are in series connection with the boiler control.

In operation, if the actuator 74 is cold and the valve closed, the contacts 100 are closed and the contacts 102 are opened. If the thermostat 22 closes its circuit the heater 76 is energized through the closed contacts 100 and the actuator 74 forces the member 72 to open the valve.

When the valve has opened a predetermined distance the contacts 102 close to complete the circuit to the boiler control, which then operates. When the valve opens a further predetermined distance the contacts 100 open, interrupting the circuit to the heater 76. This initiates a cycling action in which the heater 76 first cools to allow the valve to close sufficiently to reclose the contacts 100, then becomes reenergized, and so on. The oscillation or cycling of the valve member continues indefinitely while the thermostat 22 is closed, but is not of sufficient amplitude to open the contacts 102. Therefore the boiler control remains continuously energized during this time.

When the thermostat opens its circuit the heater 76 ceases to apply heat to the actuator 74 and the valve closes, thereby shutting off the boiler control by opening the contacts 102.

It will be seen that the electrically actuated diaphragm sealed valve hereinabove described represents a substantial improvement over conventional diaphragm sealed valves, in that provision has been included, according to this invention, to provide for an added seal under conditions that permit continued operation of the unit in case of failure of the diaphragm. This renders the unit more dependable at a relatively minor increase in the cost of production, and permits greater reliability as well as additional uses not hitherto deemed advisable where a diaphragm seal is used. It will be appreciated that, while the invention has been described with reference to a specific embodiment, various modifications in structure may be incorporated. For example, the sleeve 78 may be integral with the body 28.

Other modifications and variations in structure, as suggested above, or others within the skill of one familiar with this art, may also be included without departing from the spirit and scope of this invention.

Having thus described the invention, we claim:

1. In a poppet valve having a valve stem and a sleeve of substantially greater diameter to receive the stem, a seal for the stem including a flexible diaphragm sealing the sleeve and stem, an annular flexible seal member in the general shape of a washer frictionally received in the sleeve about the stem and having a loose fit on the stem, and a plug member having an annular surface on the stem in the space between the diaphragm and seal member, the seal member being dimensioned so as to provide a leakage path for limited fluid flow to and from said space when the diaphragm is intact and to seat against said surface to seal the sleeve when the diaphragm is ruptured.

2. The combination according to claim 1, in which the plug member is of smaller diameter than the sleeve.

3. A poppet valve having, in combination, a valve body having a valve seat and an opening, a diaphragm sealing the opening, a valve cooperating with the seat with a stem extending to the diaphragm, the valve body having a sleeve about the stem, an annular seal member frictionally received in the sleeve about the stem and having clearance in relation to the stem, and an annular plug member on the stem between the diaphragm and seal member having peripheral clearance in relation to the sleeve and a surface adapted for sealingly engaging the seal member.

4. The combination according to claim 3, in which the valve has a portion engageable with the seal member and spaced from the plug member a greater distance than the dimension of the seal member therebetween.

5. The combination according to claim 3, in which the seal member has a resilient frictional fit with the sleeve.

6. The combination according to claim 3, in which the plug member is fixed to the stem.

7. A poppet valve having, in combination, a valve body having a valve seat with its axis intersecting a wall of the body, said body also having a sleeve defining an opening in said wall about said axis, a diaphragm sealing the opening, a valve cooperating with the seat with a stem extending through the sleeve to the diaphragm, means external to the valve body to deflect the diaphragm, an annular seal member frictionally received in the sleeve about the stem and having clearance in relation to the stem, and an annular plug member on the stem between the diaphragm and seal member having peripheral clearance in relation to the sleeve and a surface adapted for sealingly engaging the seal member.

8. The combination according to claim 7, in which the seal member has a resilient frictional fit with the sleeve.

9. A seal for a valve stem reciprocable within a fluid-containing sleeve of substantially greater diameter having, in combination, a diaphragm engaged with the stem and sealing the sleeve, an annular seal member frictionally received in the sleeve about the stem and having clearance in relation to the stem, and an annular plug member on the stem between the diaphragm and seal member having peripheral clearance in relation to the sleeve and a surface adapted for sealingly engaging the seal member.

10. The combination according to claim 9, in which the plug member is fixed to the stem.

11. The combination according to claim 9, in which the stem has a portion engageable with the seal member and spaced from the plug member a greater distance than the dimension of the seal member therebetween.

References Cited in the file of this patent
UNITED STATES PATENTS

| | | |
|---|---|---|
| 2,144,754 | Forbes | Jan. 24, 1939 |
| 2,618,458 | Fosbender | Nov. 18, 1952 |
| 2,699,801 | Schleyer | Jan. 18, 1955 |